US008538432B2

(12) United States Patent
Lee et al.

(10) Patent No.: US 8,538,432 B2
(45) Date of Patent: Sep. 17, 2013

(54) METHOD OF EXECUTING HANDOVER IN A MOBILE COMMUNICATION SYSTEM

(75) Inventors: Moon Il Lee, Anyang-Si (KR); Jin Hyuk Jung, Anyang-Si (KR); Jae Won Jang, Anyang-Si (KR); Jin Young Chun, Anyang-Si (KR); Bin Chul Ihm, Anyang-Si (KR); Ki Seon Ryu, Anyang-Si (KR); Yong Ho Kim, Anyang-Si (KR); Jeong Ki Kim, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 12/446,335

(22) PCT Filed: Oct. 19, 2007

(86) PCT No.: PCT/KR2007/005150
§ 371 (c)(1),
(2), (4) Date: Sep. 21, 2010

(87) PCT Pub. No.: WO2008/048071
PCT Pub. Date: Apr. 24, 2008

(65) Prior Publication Data
US 2011/0009158 A1 Jan. 13, 2011

(30) Foreign Application Priority Data
Oct. 19, 2006 (KR) .................. 10-2006-0102009
May 14, 2007 (WO) ............. PCT/KR2007/002360

(51) Int. Cl.
*H04W 36/00* (2009.01)
(52) U.S. Cl.
USPC ........... 455/436; 370/331; 370/328; 370/311; 455/574; 455/343.1; 455/502; 455/552.1; 455/343.2; 455/524; 455/439
(58) Field of Classification Search
USPC .......................................................... 455/436
See application file for complete search history.

(56) References Cited

U.S. PATENT DOCUMENTS 7,130,668 B2 * 10/2006 Chang et al. .................. 455/574
8,160,001 B2 * 4/2012 Bitran ........................... 370/328
(Continued)

FOREIGN PATENT DOCUMENTS
WO    WO-2006/132469 A2    12/2006

OTHER PUBLICATIONS

Tolli D. et al,:"Additional Scan Measurement Metric, Triggers and Reporting Modes" IEEE 802.16 Broadband wireless Access Working Group, IEEE C802.16E-05/219R1 , Jun. 8, 2005, pp. 1-18 XP002584337, URL:http:www.ieee802.org/16/tge/contrib/C80216e-05_219r1.pdf>.*

OTHER PUBLICATIONS

Yanover Vet al: Sleep Mode Generic Mechanism, IEEE 802.16 Broadband wireless Access Working Group, IEEE C802.16E-04/459R2,Nov. 12, 2004, pp. 1-16, XP008120999.*
Tzavidas, S. et al: "Additional Scan Measurement Metric, Triggers and Reporting Modes",IEEE 802.16 Broadband wireless Access Working Group, IEEE C802.16-05/219R0, Apr. 27, 2005, pp. 0-9 XP008120996E/.*

*Primary Examiner* — Kent Chang
*Assistant Examiner* — Benjamin Morales Fernandez
(74) *Attorney, Agent, or Firm* — Birch, Stewart, Kolasch & Birch, LLP

(57) ABSTRACT

Disclosed are methods of executing a handover related operation in a power saving mode in accordance with handover triggering information. One of the methods of executing handover of a mobile station in a mobile communication system comprises determining an enabled status of at least one handover related operation in a specific operation mode between the mobile station (MS) and a network, receiving control information related to the at least one handover related operation from the network, entering the specific operation mode, changing the enabled status of the at least one handover related operation in the specific operation mode, and performing the enabled handover related operation in accordance with the changed enabled status and the control information.

11 Claims, 13 Drawing Sheets

(56) References Cited

U.S. PATENT DOCUMENTS

| | | | |
|---|---|---|---|
| 8,311,011 B2* | 11/2012 | Kim et al. | 370/331 |
| 2004/0219926 A1* | 11/2004 | Kim et al. | 455/452.2 |
| 2005/0144303 A1 | 6/2005 | Zhang et al. | |
| 2006/0281436 A1* | 12/2006 | Kim et al. | 455/343.2 |
| 2007/0104145 A1* | 5/2007 | Jan | 370/331 |

* cited by examiner

METHOD OF EXECUTING HANDOVER IN A MOBILE COMMUNICATION SYSTEM

TECHNICAL FIELD

The present invention relates to a method of executing handover related action in accordance with handover triggering information in a power saving mode.

BACKGROUND ART

If a mobile station moves from a specific mobile communication region to another mobile communication region, handover which automatically converts a communication channel to prevent communication from being disconnected is performed. The general procedure of performing such handover will be described as follows. FIG. 1 is a flow chart illustrating the procedure between a mobile station and base stations to sequentially illustrate the general procedure of executing handover according to the related art.

A service base station transmits handover triggering information to the mobile station through a downlink channel descriptor (DCD) for transmission of channel information or message (MOB_NBR_ADV) for transmission of information of neighboring base stations (S101), wherein the handover triggering information designates trigger conditions of various operations of the mobile station with respect to handover, i.e., handover related operations. One example of lists included in the handover triggering information is as follows.

TABLE 1

| Name | Type | Length (1 byte) | Value |
| --- | --- | --- | --- |
| Type/Function/Action | 54.1 | 1 | See Table 358b for description |
| Trigger value | 54.2 | 1 | Value to be compared with measurement metric value to decide trigger conditions |
| Trigger averaging duration | 54.3 | 1 | Averaging duration of metric measurement value in mobile station |

Also, the handover triggering information may further include the following lists.

TABLE 2

| Name | Length | Value |
| --- | --- | --- |
| Type | 2 bits (MSB) | 0x00: CINR metric<br>0x01: RSSI metric<br>0x02: RTD metric<br>0x03: Reserved |
| Function | 3 bits | 0x00: Reserved<br>0x01: metric of neighboring base station is greater than absolute value<br>0x02: metric of neighboring base station is smaller than absolute value<br>0x03: metric of neighboring base station is relatively greater than metric of service base station<br>0x04: metric of neighboring base station is relatively smaller than metric of service base station<br>0x05: metric of service base station is greater than absolute value<br>0x06: metric of service base station is smaller than absolute value<br>0x07: Reserved |
| Enabled Action | 3 bits (LSB) | 0x00: Reserved<br>0x01: MOB_SCN-REP message response after each scanning interval to trigger<br>0x02: MOB_MSHO-REQ message response to trigger |

TABLE 2-continued

| Name | Length | Value |
| --- | --- | --- |
| | | 0x03: mobile station initiates scanning of neighboring base station by transmitting MOB_SCN-REQ message in response to trigger<br>0x04: mobile station is advised to perform scanning during trigger<br>0x05~0x07: Reserved |

Afterwards, if the mobile station triggers scanning initiation of a neighboring base station to a service base station as a predetermined metric received from the neighboring base station satisfies scanning initiation condition (0x03 of Action list) of the handover triggering information (S102), the mobile station transmits a scanning request message (MOB_SCN-REQ) to the service base station, and the service base station allocates a predetermined scan duration and at the same time transmits a scanning response message (MOB_SCN-RSP) to the corresponding mobile station in response to the scanning request message (MOB_SCN-REQ). The mobile station synchronizes a downlink signal with the neighboring base station for the allocated scan duration and measures quality level of the signal received from the neighboring base station, strength of the signal, transmission synchronization, etc. to perform scanning of the neighboring base station (S103).

If the mobile station triggers scan reporting to the service base station as the scanning result satisfies scan report condition (0x01 of Action list) of the handover triggering information (S104), the mobile station transmits carrier to interference and noise ratio (CINR), received signal strength indication (RSSI) and round trip delay (RTD), etc., which are measured through the scanning, to the service base station through the MOB_SCN-REP message.

If the mobile station triggers handover request to the service base station as the scanning result satisfies handover condition (0x02 of Action list) of the handover triggering information (S105), the mobile station transmits the handover request message (MOB_MSHO-REQ) to the service base station, and the service base station transmits the handover response message (MOB_MSHO-RSP) to the corresponding mobile station in response to the handover request message. Subsequently, the mobile station transmits a handover indication message (MOB_HO-IND) to the service base station to request release of connection with the service base station (S106) and then performs the network re-registration procedure with a handover target base station.

Meanwhile, a broadband wireless access system based on IEEE802.16e system supports a power saving mode for minimizing power consumption of the mobile station. The operation of the mobile station in the power saving mode is performed by repetition of a sleep interval and a listening interval. The sleep interval and the listening interval are respectively determined by each value of a sleep window and a listening window. In this case, the sleep interval and the listening interval may have different values depending on characteristics of traffic set in a corresponding mobile station. The power saving mode can be classified into power saving mode class of type 1, power saving mode class of type 2, and power saving mode class of type 3.

The mobile station which is being operated in the power saving mode can perform scanning of the neighboring base station even though the mobile station does not receive and transmit the scanning request message (MOB_SCN-REQ) and the scanning response message (MOB_SCN-RSP) from and to the service base station. If the mobile station transmits the scanning report message to the service base station whenever performing scanning of the neighboring base station, a problem occurs in that power consumption of the mobile station is inevitably required unlike intention of the power saving mode. However, if the base station does not receive the scanning report message for handover from the mobile station, a problem occurs in that the base station cannot control handover to the mobile station of the power saving mode appropriately.

Furthermore, a problem occurs in that the current mobile station fails to effectively perform handover related operation and power saving operation as the mobile station does not use characteristics of each class by performing handover related operation regardless of the power saving class which is being operated.

DISCLOSURE OF THE INVENTION

Accordingly, the present invention is directed to a method of executing handover in a mobile communication system, which substantially obviates one or more problems due to limitations and disadvantages of the related art.

An object of the present invention is to provide a method of executing handover in a mobile communication system, in which conventional handover triggering information transmitted from a base station further includes at least one kind of action class information to allow each class to perform different handover relation operations.

Another object of the present invention is to provide a method of executing handover in a mobile communication system, in which a plurality of handover related operations triggered by a mobile station are simultaneously designated to reduce the number of transmission and reception times of triggering information.

In one embodiment of the present invention, a method of executing handover of a mobile station in a mobile communication system comprises receiving control information associated with handover and first indication information from a service base station, the first indication information indicating at least one action class which is subject to application of the control information, and performing a handover related operation in accordance with the control information if the mobile station corresponds to the at least one action class indicated by the first indication information.

In another aspect of the present invention, a method of executing handover of a mobile station in a mobile communication system includes determining an enabled status of at least one handover related operation in a specific operation mode between the mobile station and a network, receiving control information related to the at least one handover related operation from the network, entering the specific operation mode, changing the enabled status of the at least one handover related operation in the specific operation mode, and performing the enabled handover related operation in accordance with the changed enabled status and the control information.

BEST MODE FOR CARRYING OUT THE INVENTION

Figure 1:
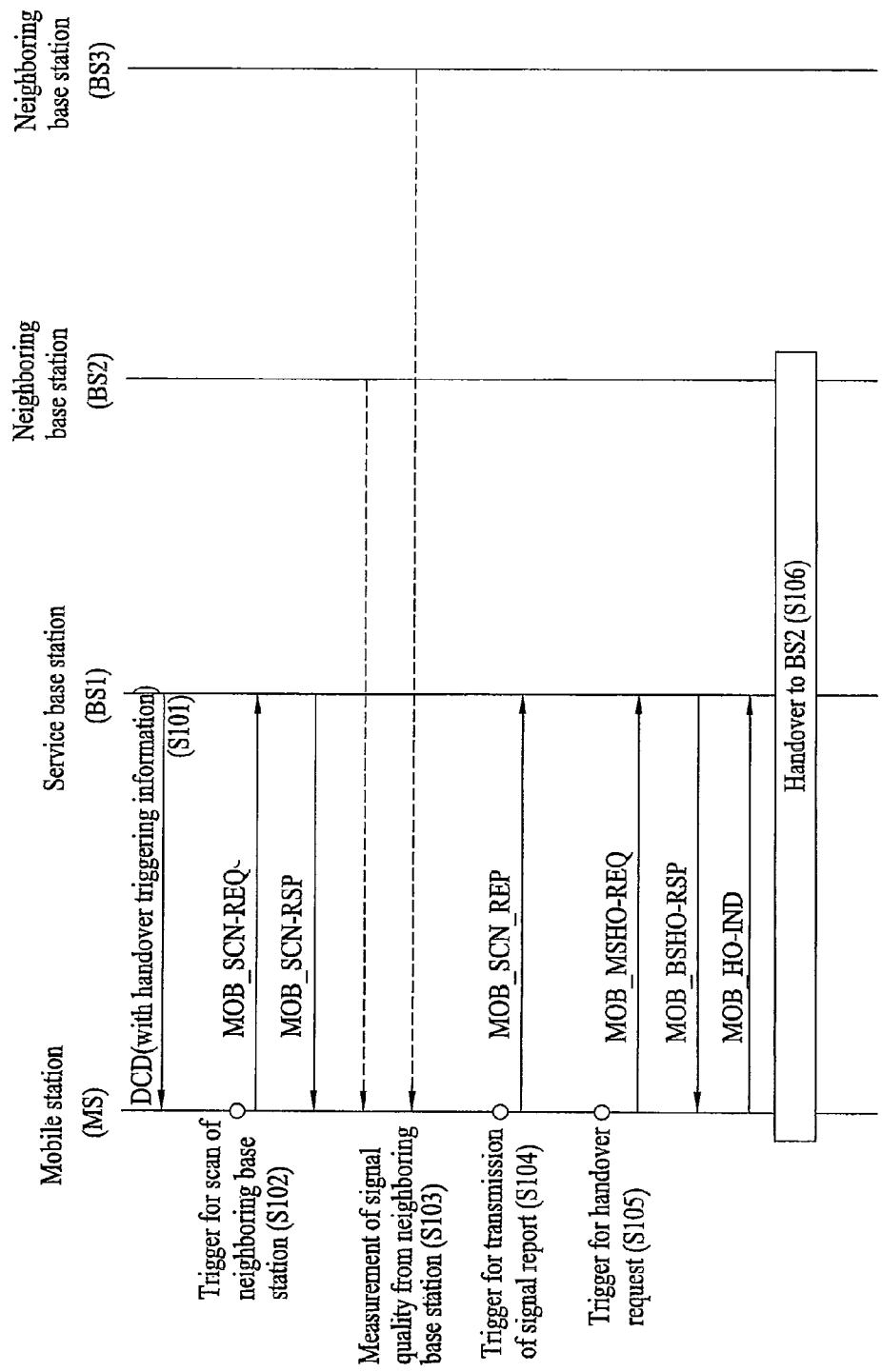
FIG. 1 is a flow chart between a mobile station and base stations to sequentially illustrate a general procedure of executing handover according to the related art.

Hereinafter, preferred embodiments according to the present invention will be described in detail. To this end, an embodiment of an improved handover triggering information suggested in the present invention will be described, and a method of executing handover according to the present invention will be described with reference to the embodiment of the improved handover triggering information. Then, a configuration of a mobile station which supports such handover will be described.

According to one aspect of the present invention, handover triggering information according to the related art, which is transmitted from the base station, further includes at least one kind of operation class information so that each class performs separate handover related operation. To this end, separate control information is provided to the mobile station. One embodiment of the handover triggering information which further includes operation class information will be described.

TABLE 3

| Name | Type | Length (1 byte) | Value |
|---|---|---|---|
| Type/Function/Action | 54.1 | 1 | |
| Trigger value | 54.2 | 1 | value to be compared with measurement metric value to decide trigger condition |
| Trigger averaging duration | 54.3 | 1 | Averaged time period of metric value measured in mobile station |
| Trigger operation mode/Combined logical function | 54.4 | 1 | Bit #0: Normal operations<br>Bit #1: Power Saving Mode of Class 1<br>Bit #2: Power Saving Mode of Class 2<br>Bit #3: Power Saving Mode of Class 3<br>Bit #4~#7: Reserved |

As illustrated in Table 3, the handover triggering information according to the present invention further includes trigger operation mode/combined logical function item of type 54.4 to designate type of the power saving class in which handover related operation is to be triggered. Particularly, to simultaneously designate one or more power saving classes, a bit map method which allocates class for each bit constituting a corresponding item may be used. For example, if a value of trigger operation mode/combined logical function item is 0x06(00000110), a specific triggering operation is performed provided that the mobile station is operated in class 1 or class 2 of the power saving mode.

Furthermore, according to another aspect of the present invention, a plurality of handover related operations triggered in the mobile station are simultaneously designated. To this end, in handover triggering information according to the related art, Enable Action item may be designated in a bit map method or separate control information which simultaneously designates a plurality of handover related operations may be provided to the mobile station. In this case, separate control information is preferably used to simultaneously designate a plurality of handover related operations to be performed during the sleep interval of the power saving mode. Table 4 illustrates an example of the improved handover triggering information according to one aspect of the present invention, and Table 5 illustrates an example of separate control information according to another aspect of the present invention.

TABLE 4

| Name | Length | Value |
|---|---|---|
| Type | 2 bits (MSB) | 0x00: CINR metric<br>0x01: RSSI metric<br>0x02: RTD metric<br>0x03: Reserved |
| Function | 3 bits | 0x00: Reserved<br>0x01: metric of neighboring base station is greater than absolute value<br>0x02: metric of neighboring base station is smaller than absolute value<br>0x03: metric of neighboring base station is relatively greater than metric of service base station<br>0x04: metric of neighboring base station is relatively smaller than metric of service base station<br>0x05: metric of service base station is greater than absolute value<br>0x06: metric of service base station is smaller than absolute value<br>0x07: Reserved |

TABLE 4-continued

| Name | Length | Value |
|---|---|---|
| Enabled Action | 3 bits (LSB) | Bit #0: MOB_SCN-REP message response after each scanning time period for trigger<br>Bit #1: MOB_MSHO-REQ message response for trigger<br>Bit #2: mobile station initiates scanning of neighboring base station for trigger by transmitting MOB_SCN-REQ message |

TABLE 5

| Name | Length | Value |
|---|---|---|
| Enabled Action Triggered | 1 byte | If Bit #0 is set to 1: MOB_SCN-REP message response after each scanning time period for trigger<br>If Bit #1 is set to 1: MOB_MSHO-REQ message response for trigger<br>If Bit #2 is set to 1: mobile station initiates scanning of neighboring base station for trigger by transmitting MOB_SCN-REQ message Bit #3~Bit #7: Reserved |

In Table 5, Bit #3~Bit #7 of Enabled Action Triggered item are default values and are preferably set to 0.

The handover triggering information of Table 4 and/or Table 5 may be transmitted to the mobile station through a message (downlink channel descriptor; DCD) for transmission of channel information item or a message (MOB_NBR-ADV) for transmission of neighboring base station information in the same manner as the related art. Alternatively, the handover triggering information may be transmitted to the mobile station along with a sleep response message (MOB_SLP-RSP) according to request for conversion to a sleep mode of the mobile station or a ranging response message according to request for ranging of the mobile station. Particularly, the information of Table 5 is preferably transmitted as described in another aspect of the present invention separately from the handover triggering information according to the related art. The information of Table 5 may be used when correction or update of the handover triggering information transmitted through the DCD or the MOB_NBR-ADV is needed in case of the power saving mode of the mobile station.

Furthermore, it is possible to allow the mobile station of the power saving mode to negotiate whether to perform the handover triggering operation during network entry and re-entry procedure of the mobile station by using the parameters of Table 5. In other words, the mobile station can negotiate enabling/disabling of the handover triggering operation of the power saving mode by transmitting and receiving the parameters of Table 5 to and from the base station during the network entry procedure. Afterwards, the mobile station can change enabling/disabling of the handover triggering operation by using the parameters of Table 5 when transmitting and receiving a sleep request message and a sleep response message to and from the base station for conversion to the power saving mode.

Hereinafter, various embodiments of performing handover in the power saving mode by using the improved handover triggering information of the present invention will be described.

First Embodiment

Figure 2:
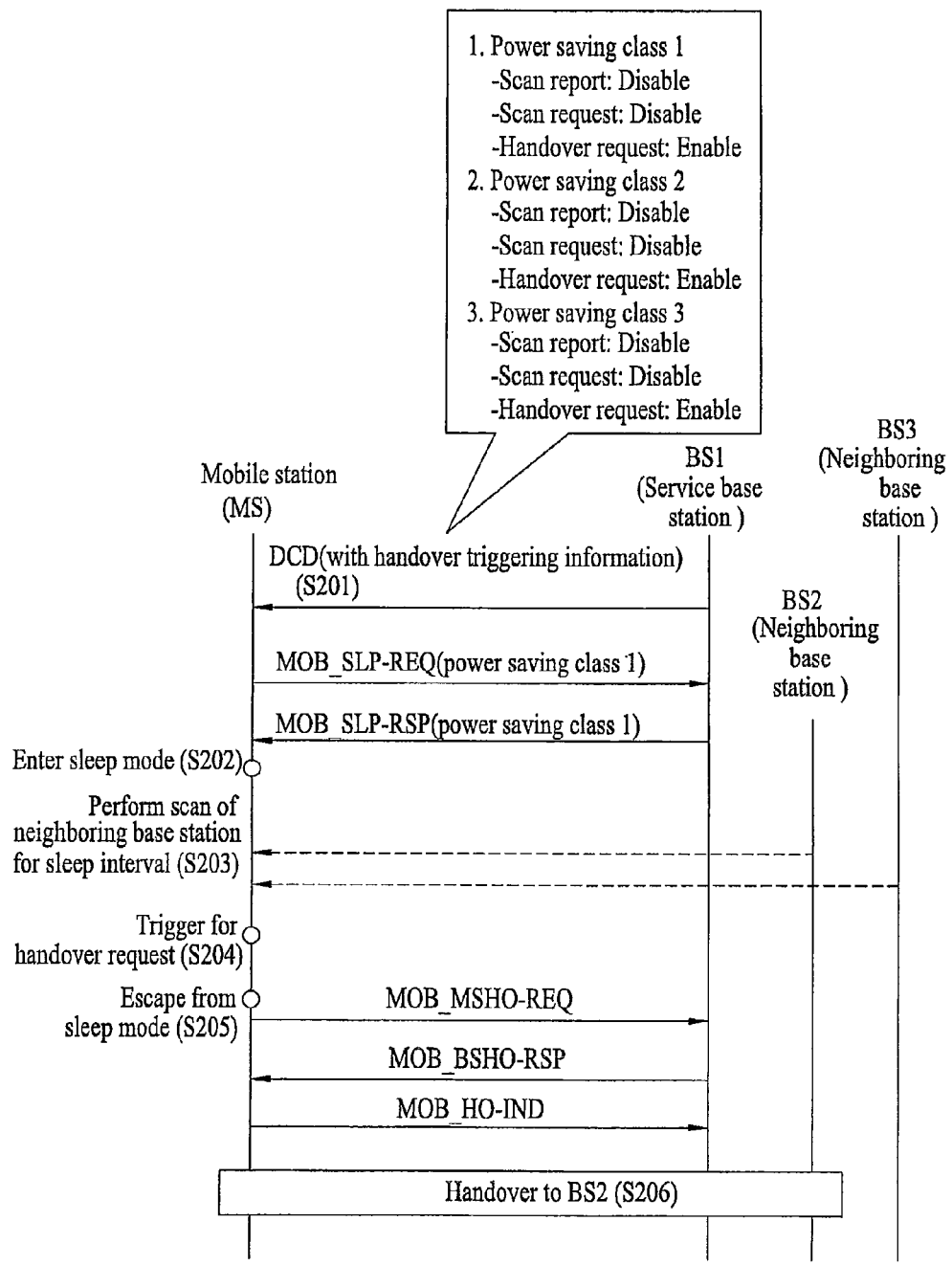
FIG. 2 is a flow chart between a mobile station and base stations to sequentially illustrate an example of a procedure of executing handover in a power saving mode in accordance with the present invention.

FIG. 2 is a flow chart between the mobile station and base stations to illustrate the embodiment of performing handover in the power saving mode by using the handover triggering information received through a downlink channel descriptor (DCD) message or the neighboring base station information (MOB_NBR-ADV) message.

In this embodiment, it is supposed that the mobile station is operated in the power saving mode of class 1. For reference, class 1 targets a best effort (BE) having characteristics of the existing Internet traffic or a non-real-time variable rate (nrt-VR), and is defined by an initial sleep window, a final window base, a final window exponent, a listening window, and a start frame number for sleep window.

The mobile station receives the handover triggering information from a service base station through the channel information message (DCD) or the neighboring base station information message (MOB_NBR-ADV) (S201). In this case, the handover triggering information includes items of Table 3 and Table 4. In the first embodiment, it is supposed that class 1 to class 3 are all designated as the operation target classes, and that scan report: disable, scan request: disable, and handover request: enable are equally designated for all the classes.

Afterwards, the mobile station transmits the sleep request message (MOB_SLP-REQ) for conversion to the power saving mode of class 1 to the service base station, and receives the sleep response message (MOB_SLP-RSP) in response to the sleep request message to enter the sleep mode (S202).

The mobile station can perform scanning of a neighboring base station even for the sleep interval (S203), and compares metrics, such as signal to interference and noise ratio (SINR), received signal strength indication (RSSI) and round trip delay (RTD), which are collected through scanning, with the control information of Table 14 to identify whether to perform handover.

As a result, if a handover request event is generated as it is determined that handover is to be performed, the mobile station checks whether class 1 is designated in the control information of Table 3 as the operation target class before requesting handover of the service base station. In the first embodiment, since class 1 is designated as the operation target class and especially handover request item is set to Enable, trigger for handover request can be performed (S204).

The mobile station escapes from the sleep mode to perform the handover procedure as the handover request trigger is performed (S205), and transmits the handover request message (MOB_MSHO-REQ) to the service base station. If the handover response message is arrived from the service base station, the mobile station transmits the handover indication message (MOB_HO-IND) to the corresponding base station to release connection with the service base station. Subsequently, the mobile station performs the network re-registration procedure with the handover target base station (BS 2) (S206).

Figure 3:
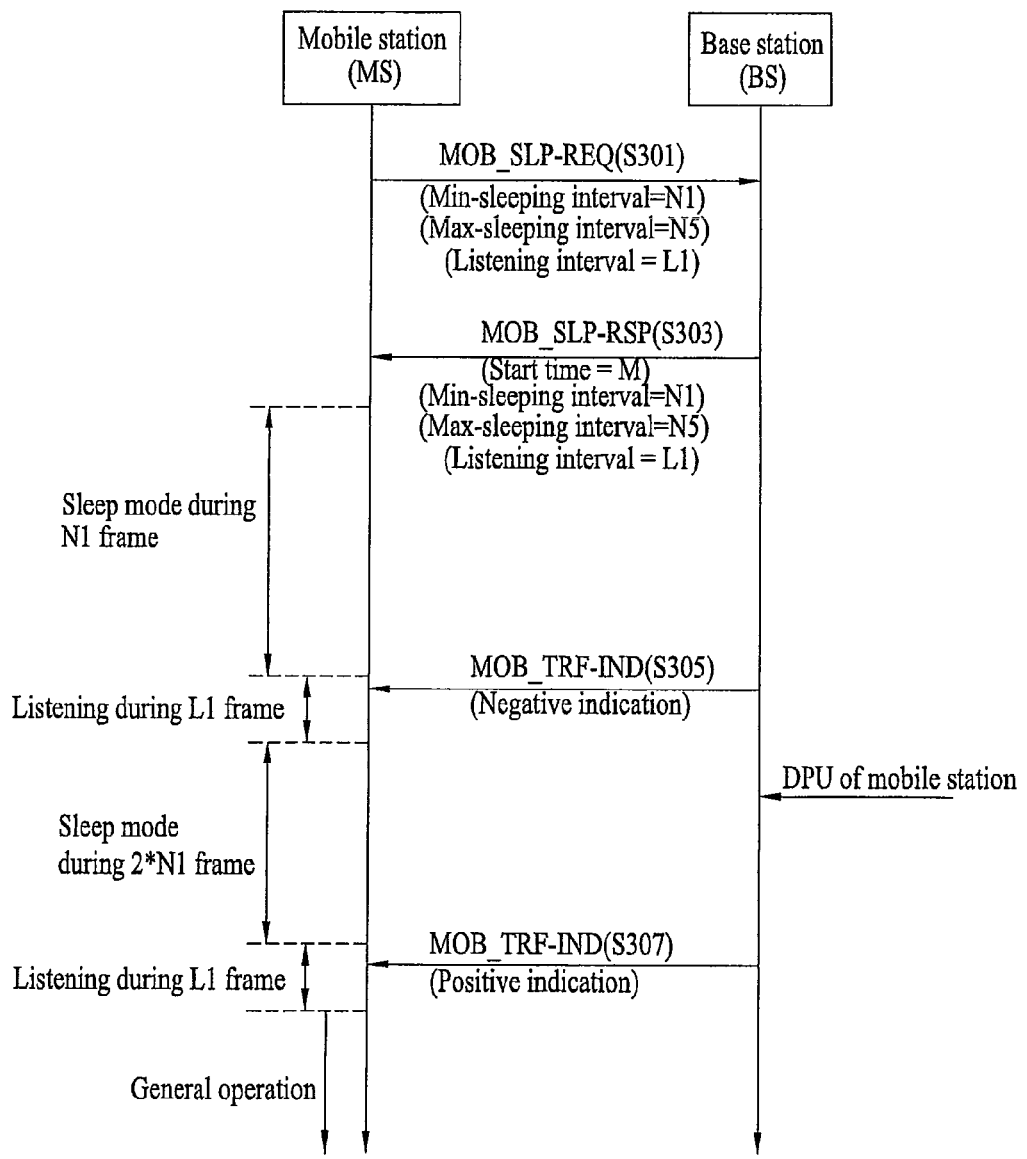
FIG. 3 is a flow chart between a mobile station and base stations to sequentially illustrate a general procedure of a mobile station in class 1 of a power saving mode.

The step S203, i.e., the operation procedure in class 1 of the power saving mode will be described in more detail with reference to FIG. 3.

The mobile station sets values such as initial sleep window, final sleep window and listening window in the sleep request message (MOB_SLP-REQ) and forwards the set values to the base station to request conversion to class 1 of the power saving mode (S301). An example of the sleep request message (MOB_SLP-REQ) is as follows.

TABLE 6

| Parameter Name | length (bit) | note |
|---|---|---|
| Management message type = 50 | 8 | |
| Number of Classes | 8 | Number of power saving classes. |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| Traffic_triggered_wakening_flag | 1 | |
| Reserved | 3 | |
| initial-sleep window | 6, 8 | |
| Listening-window | 8 | |
| final-sleep window base | 10 | |
| final-sleep window exponent | 3 | |
| Number_of_Sleep_CIDs | 3 | |
| CID | 16 | |
| TLV encoded information | variable | |

If the base station allows conversion to the power saving mode of the corresponding mobile station, the base station forwards the sleep response message (MOB_SLP-RSP) to the mobile station (S303), wherein values such as initial sleep window, final sleep window, listening window, and initial frame number of sleep window are set in the sleep response message. At this time, an example of the sleep response message (MOB_SLP-RSP) is as follows.

TABLE 7

| Parameter Name | length (bit) | note |
|---|---|---|
| Management message type = 51 | 8 | |
| Number of Classes | 8 | Number of power saving classes. |
| Length of Data | 7 | |
| Sleep Approved | 1 | |
| Definition | 1 | |
| Operation | 1 | |
| Power_Saving_Class_ID | 6 | |
| Start_frame_number | 6 | |
| Reserved | 2 | |
| Power_Saving_Class_Type | 2 | |
| Direction | 2 | |
| initial-sleep window | 8 | |
| Listening-window | 8 | |
| final-sleep window base | 10 | |
| final-sleep window exponent | 3 | |
| TRF-IND required | 1 | |
| Traffic_triggered_wakening_flag | 1 | |
| Reserved | 1 | |
| SLPID | 10 | |
| Reserved | 2 | |
| Number_of_CIDs | 4 | |
| CID | 16 | |
| Maintain Diversity Set and Anchor BS | 1 | |
| MDHO/FBSS duration (s) | 3 | |
| Padding | Variable | If needed for alignment to byte boundary |
| Power Saving Class TLV encoded information | Variable | |
| REQ-duration | 8 | |
| TLV encoded information | Variable | |

The mobile station maintains a sleep interval equal to the initial sleep window at the conversion time to the power saving mode. If the sleep interval expires, the mobile station receives a traffic notification message (MOB_TRF_IND) from the base station for the listening interval preceded by the sleep interval (S305). In case of no down traffic toward the mobile station (negative indication), the mobile station maintains the power saving mode for a time period equivalent to twice of the initial sleep window. At this time, an example of the traffic notification message (MOB_TRF_IND) is as follows.

[Table 8]

| Parameter Name | length (bit) | note |
| --- | --- | --- |
| Management message type = 52 | 8 | |
| FMT | 1 | |
| SLPID Group Indication bit-map | 32 | N-th bit of SLPID-Group indication bit-map MSB corresponds to N = 0] is allocated to SLPID Group that includes MS with SLPID values from N * 32 to N * 32 + 31 Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values: 0: Negative indication 1: Positive indication |
| Num_Pos SLPIDs | 8 10 | Number of CIDs following |
| Padding | variable | If needed, for alignment to byte boundary. |
| TLV encoded items | variable | |

The sleep interval continues to increase through the above manner (set next sleep window to twice of previous sleep window). The final sleep window size is set as follows through final window base and final window exponent which are determined through the sleep response message (MOB_SLP-RSP).

final sleep window=final sleep window base*$2^{final\ window\ exponent}$

If the mobile station receives the traffic notification message for the listening interval (positive indication), the mobile station ends the power saving mode, wherein the traffic notification message indicates down traffic toward the mobile station.

Second Embodiment

Figure 4:
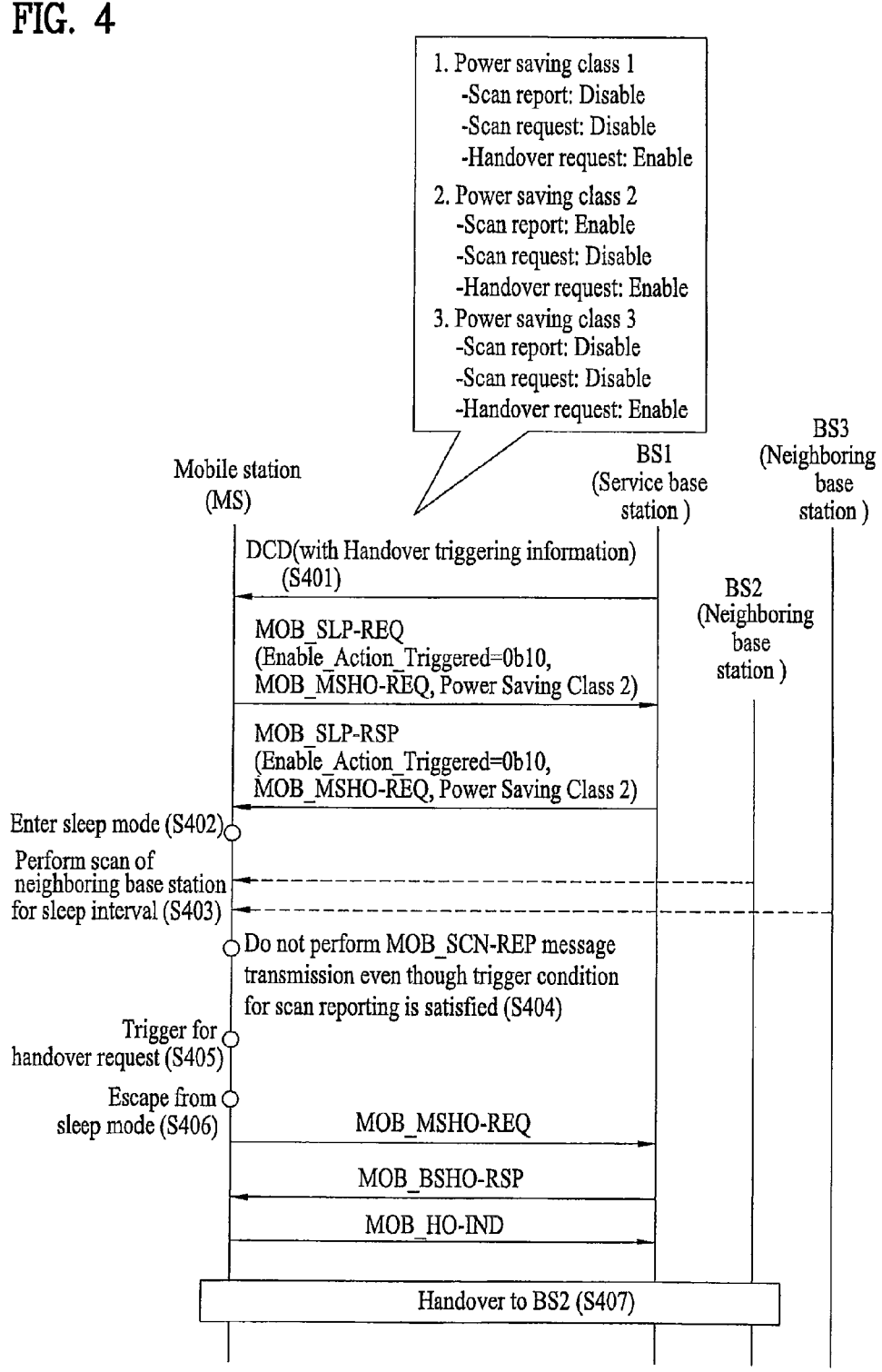
FIG. 4 is a flow chart between a mobile station and base stations to sequentially illustrate an example of a procedure of executing handover in a power saving mode in accordance with the present invention.

FIG. 4 is a flow chart between the mobile station and base stations to illustrate the embodiment of performing handover in the power saving mode by using the handover triggering information received through the downlink channel descriptor (DCD) message or the neighboring base station information (MOB_NBR-ADV) message at the conversion time to the power saving mode.

In this embodiment, the enabled scan report operation is disabled in the power saving mode, and it is supposed that the mobile station is operated in the power saving mode of class 2. For reference, class 2 targets VoIP or a real-time variable rate (rt-VR), and is defined by three values, i.e., initial sleep window, listening window, and start frame number for sleep window.

The mobile station receives the handover triggering information from the service base station through the channel information message (DCD) or the neighboring base station information message (MOB_NBR-ADV) (S401). In this case, the handover triggering information includes items of Table 3 and Table 4. In the second embodiment, it is supposed that class 1 to class 3 are all designated as the operation target classes, and that scan report: disable, scan request: disable, and handover request: enable are designated for class 1 and class 3 and scan report: enable, scan request: disable, and handover request: enable are designated for class 2.

Afterwards, the mobile station transmits the sleep request message (MOB_SLP-REQ) for conversion to the power saving mode of class 2 to the service base station, and receives the sleep response message (MOB_SLP-RSP) in response to the sleep request message to enter the sleep mode (S402). At this time, if the mobile station desires to disable the scan report operation during the power saving mode and enable the handover request operation only, the mobile station sets Bit #0 of Enabled_Action_Triggered item (Table 5) included in the sleep request message (MOB_SLP-REQ) to 1. If the response message (MOB_SLP-RSP) to the corrected sleep request message (MOB_SLP-REQ) is received, the mobile station corrects Enabled_Action item (Table 4) of the handover triggering information to the Enabled_Action_Triggered item.

Meanwhile, the mobile station can perform scanning of the neighboring base station even for the sleep interval (S403), and compares metric values, such as signal to interference and noise ratio (SINR), received signal strength indication (RSSI) and round trip delay (RTD), which are collected through scanning, with the control information of Table 4 to identify whether to perform scan report.

In this case, even though the predetermined metric values collected by scanning satisfy function item of Table 4 to adapt to an occurrence condition of a scan report event, since Bit #0 is disabled in Enabled_Action item of Table 4, scan report trigger is not actually performed (S404). However, as a result of scanning, if it is determined that handover is to be performed, since Bit #1 (handover request item) is enabled in Enabled_Action item of Table 4, handover request trigger is normally performed (S405).

The mobile station escapes from the sleep mode to perform the handover procedure as the handover request trigger is performed (S406), and transmits the handover request message (MOB_MSHO-REQ) to the service base station. If the handover response message is arrived from the service base station, the mobile station again transmits the handover indication message (MOB_HO-IND) to the corresponding base station to release connection with the service base station. Subsequently, the mobile station performs the network re-registration procedure with the handover target base station (BS 2) (S407).

Figure 5:
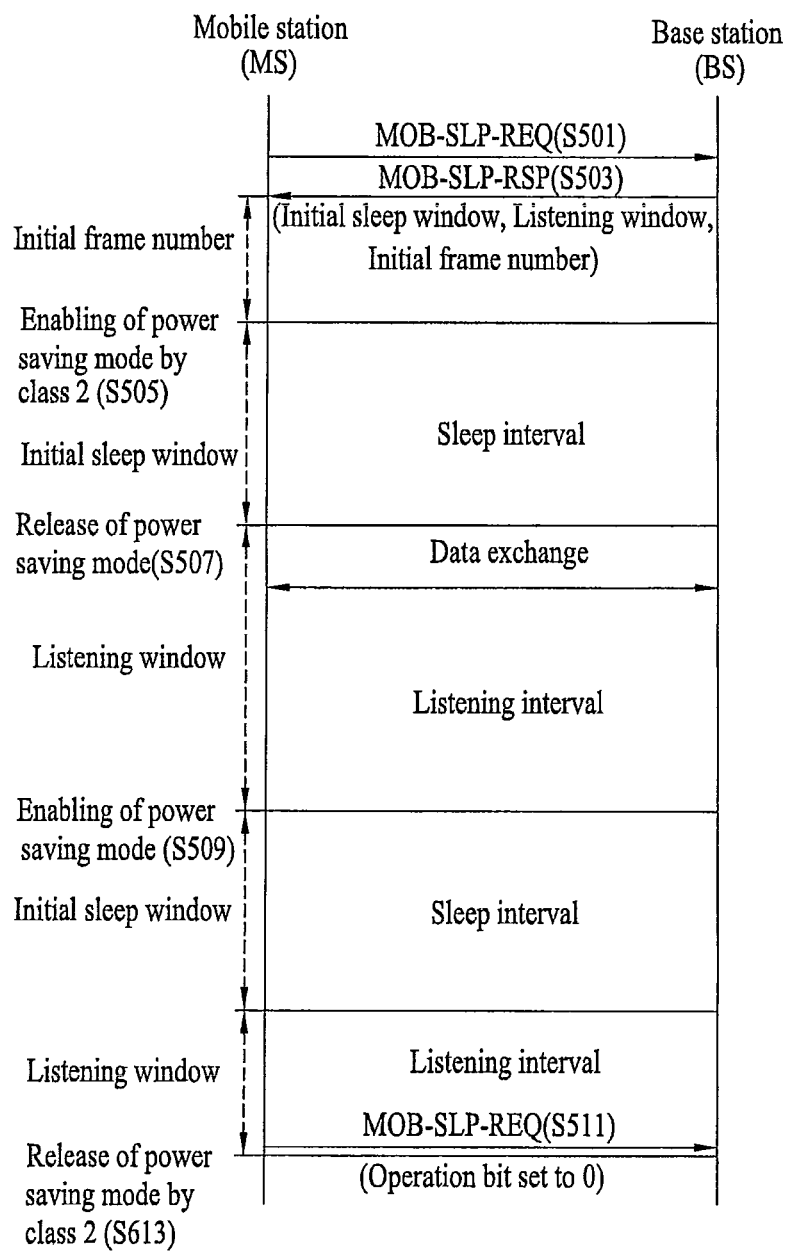
FIG. 5 is a flow chart between a mobile station and base stations to sequentially illustrate a general procedure of a mobile station in class 2 of a power saving mode.

The step S402, i.e., the operation procedure of the mobile station in class 2 of the power saving mode will be described in more detail with reference to FIG. 5.

The mobile station transmits the sleep request message (MOB_SLP-REQ) to the base station to especially request conversion to class 2 of the power saving mode (S501). The base station which has received the sleep request message MOB_SLP-REQ) sets a fixed sleep interval, a fixed listening interval, and conversion time to the power saving mode in the sleep response message (MOB_SLP-RSP) to allow the mobile station to perform conversion to class 2 of the power saving mode (S503).

The mobile station maintains the power saving mode by the sleep interval at the conversion time to the power saving mode (S505). If the sleep interval expires, the mobile station synchronizes with the base station to maintain uplink/downlink communication with the base station, and receives downlink data from the base station and transmits uplink data to the base station for the listening interval (S507).

If the listening interval expires, the mobile station maintains the power saving mode for the sleep interval to avoid power consumption (S509). Afterwards, the mobile station is operated in class 2 of the power saving mode by repeating the step S607 and the step S609.

If the mobile station desires to end class 2 of the power saving mode, the mobile station sets power saving mode end in the sleep request message (MOB_SLP-REQ) during the listening interval and transmits the set power saving mode end to the base station or transmits user data to the base station during the sleep interval (S511). After ending the power saving mode of class 2 (S513), the mobile station is normally operated.

Third Embodiment

Figure 6:
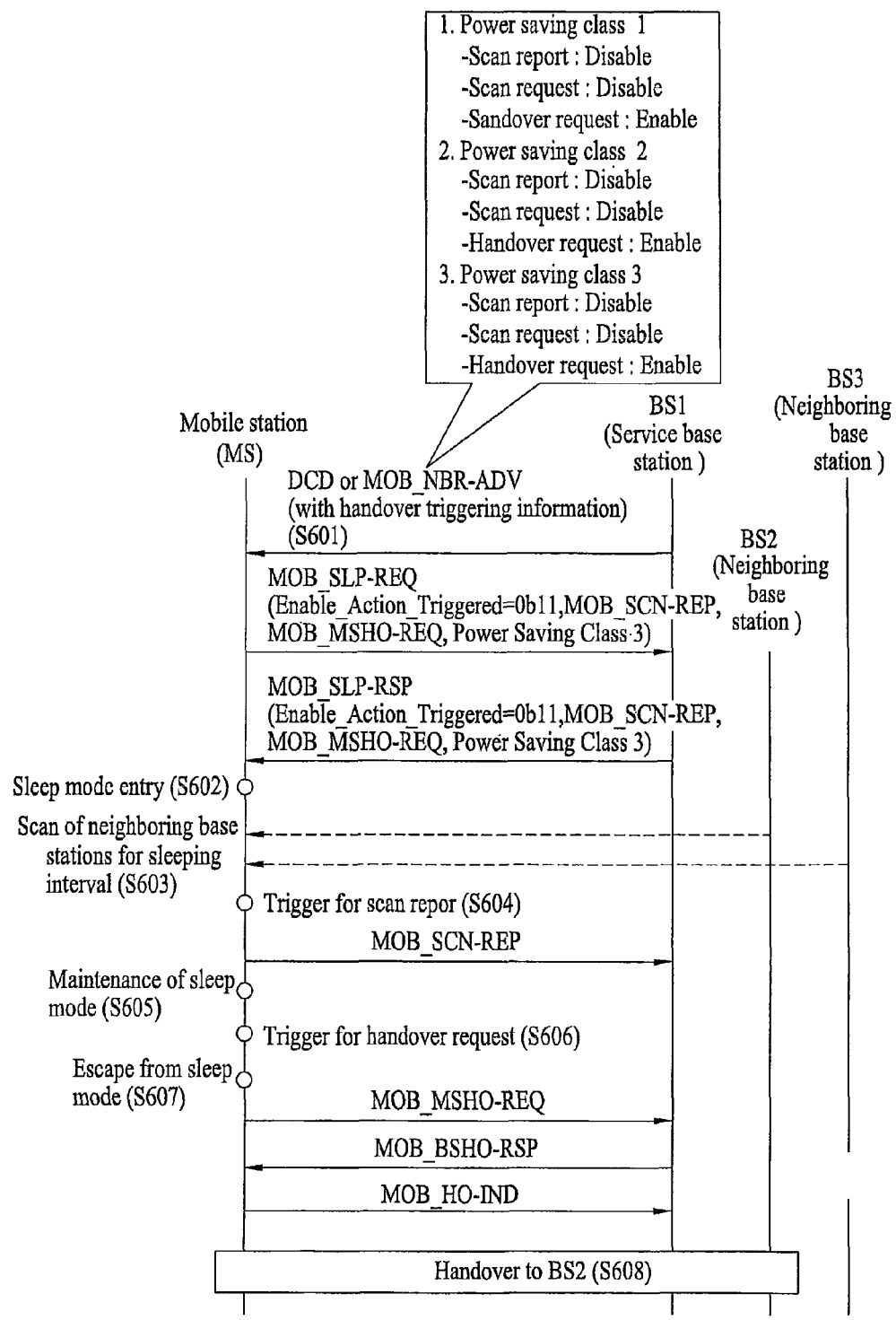
FIG. 6 is a flow chart between a mobile station and base stations to sequentially illustrate another example of a procedure of executing handover in a power saving mode in accordance with the present invention.

FIG. 6 is a flow chart between the mobile station and base stations to illustrate another embodiment of performing handover in the power saving mode by using the handover triggering information received through the downlink channel descriptor (DCD) message or the neighboring base station information (MOB_NBR-ADV) message at the conversion time to the power saving mode.

In this embodiment, the disabled scan report operation is enabled in the power saving mode, and it is supposed that the mobile station is operated in the power saving mode of class 3. For reference, class 3 is for a management message, such as DCD/UCD and MOB_NBR-ADV, to be periodically forwarded to the mobile station which is in the power saving mode, or data to be forwarded in multicast, and is defined by final window base, final window exponent, and start frame number for sleep window.

The mobile station receives the handover triggering information from the service base station through the channel information message (DCD) or the neighboring base station information message (MOB_NBR-ADV) (S601). In this case, the handover triggering information includes items of Table 3 and Table 4. In the third embodiment, it is supposed that class 1 to class 3 are all designated as the operation target classes, and that scan report: disable, scan request: disable, and handover request: enable are designated for all the classes 1 to class 3.

Afterwards, the mobile station transmits the sleep request message (MOB_SLP-REQ) for conversion to the power saving mode of class 3 to the service base station, and receives the sleep response message (MOB_SLP-RSP) in response to the sleep request message to enter the sleep mode (S602). At this time, if the mobile station desires to enable the scan report operation during the power saving mode, the mobile station sets Bit #0 of Enabled_Action_Triggered item (Table 5) included in the sleep request message (MOB_SLP-REQ) to 1. If the response message (MOB_SLP-RSP) to the corrected sleep request message (MOB_SLP-REQ) is received, the mobile station corrects Enabled Action item (Table 4) of the handover triggering information to the Enabled_Action_Triggered item.

Meanwhile, the mobile station can perform scanning of the neighboring base station even for the sleep interval (S603), and compares metric values, such as signal to interference and noise ratio (SINR), received signal strength indication (RSSI) and round trip delay (RTD), which are collected through scanning, with the control information of Table 4 to identify whether to perform scan report.

In this case, if the predetermined metric values collected by scanning satisfy function item of Table 4 to adapt to an occurrence condition of a scan report event, since Bit #0 is enabled in Enabled_Action item of Table 4, scan report trigger is performed (S604). In this way, if the condition for performing scan report is satisfied after conversion to the power saving mode, the mobile station transmits a scanning report message (MOB_SCN-REP) of a communication available interval (listening interval or availability interval) to the service base station and then maintains the power saving mode (S605).

Meanwhile, as a result of scanning, if it is determined that handover is to be performed, since Bit #1 (handover request item) is enabled in Enabled_Action item of Table 4, handover request trigger is normally performed (S606).

The mobile station escapes from the sleep mode to perform the handover procedure as the handover request trigger is performed (S607), and transmits the handover request message (MOB_MSHO-REQ) to the service base station. If the handover response message is arrived from the service base station, the mobile station again transmits the handover indication message (MOB_HO-IND) to the corresponding base station to release connection with the service base station. Subsequently, the mobile station performs the network re-registration procedure with the handover target base station (BS 2) (S608).

Figure 7:
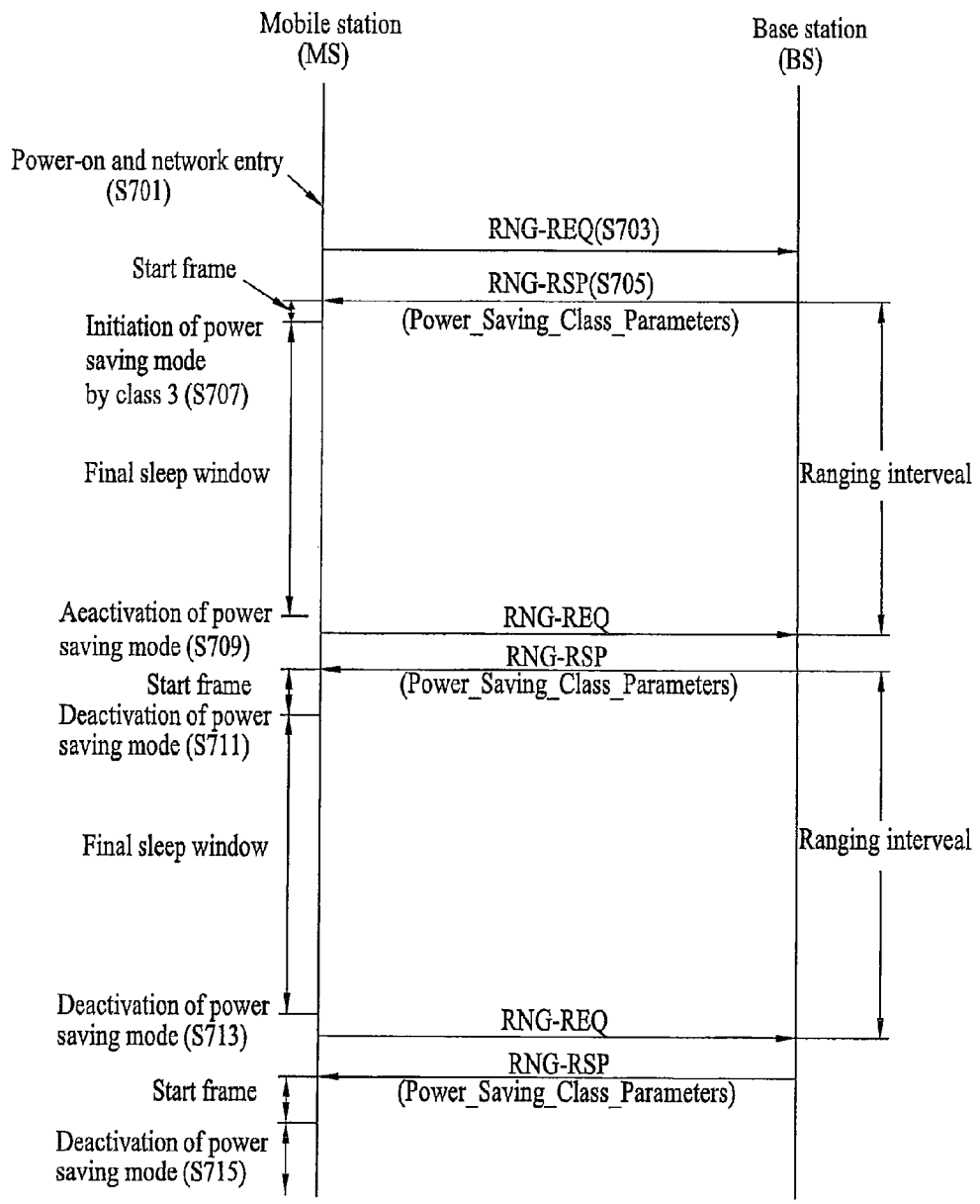
FIG. 7 is a flow chart between a mobile station and base stations to sequentially illustrate a general procedure of a mobile station in class 3 of a power saving mode.

The step S602, i.e., the operation procedure of the mobile station in class 2 of the power saving mode will be described in more detail with reference to FIG. 7.

The mobile station is powered on and converted into the normal operation mode by the network registration procedure (S701). Then, the mobile station periodically performs the ranging procedure to maintain uplink communication with the base station, thereby acquiring a suitable uplink transmission parameter. Accordingly, the mobile station forwards the ranging request message (RNG-REQ) to the base station at the periodic ranging time (S703).

The base station which has received the ranging request message from the mobile station sets uplink transmission parameter adjustment value in the ranging response message and forwards the ranging response message to the corresponding mobile station. At this time, the power saving class parameter (sleep interval, start time, etc.) illustrated in Table 8 is included in the ranging response message so as to allow the mobile station to perform conversion to class 3 of the power saving mode (S705).

The mobile station which has received the conversion to the power saving mode through the ranging response message maintains the power saving mode for the sleep interval at the conversion time to the power saving mode (S707). If the sleep interval expires, the mobile station maintains the available communication status with the base station. The mobile station performs periodic ranging with the base station at the periodic ranging time (S709). The mobile station receives the ranging response message (RNG-RSP) from the base station to acquire the parameter value for uplink communication and the power saving parameter (S711). The mobile station which has received the power saving parameter maintains the power saving mode for the sleep interval at the conversion time to the power saving mode. Afterwards, the steps S709 and S711 are repeated (S713, S715).

Figure 8:
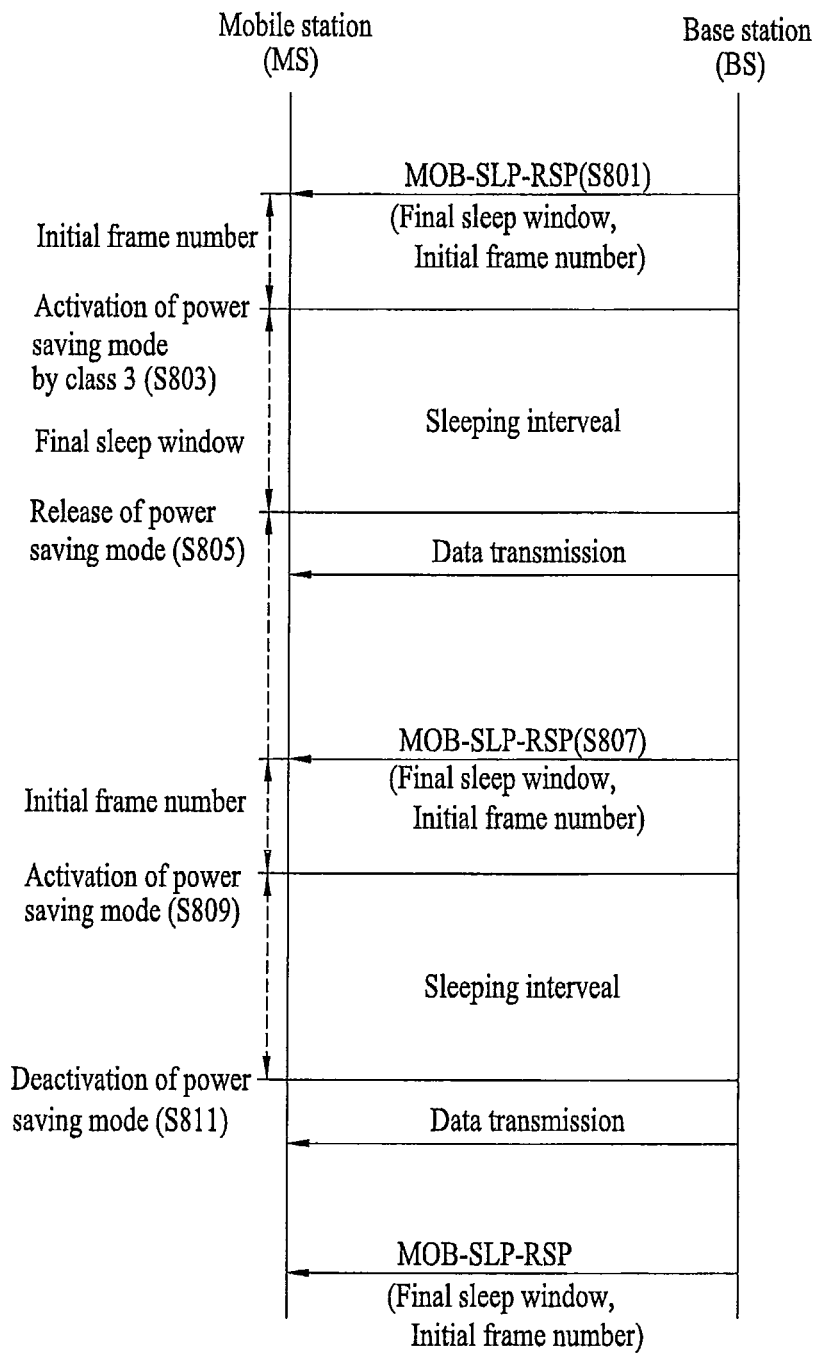
FIG. 8 is a flow chart between a mobile station and a base station to illustrate an operation procedure of the mobile station connected in multicast in class 3 of a power saving mode.

FIG. 8 is a flow chart between the mobile station and the base station to illustrate the operation procedure of the mobile station connected in multicast in class 3 of the power saving mode.

The base station forwards the sleep response message (MOB_SLP-RSP) to the mobile station to allow the mobile station to perform conversion to class 3 of the power saving mode (S801). The mobile station which has received the sleep response message maintains the power saving mode for the sleep interval at the conversion time (start frame) to the power saving mode (S803). If the sleep interval expires, the mobile station maintains the available communication status with the base station and receives data forwarded from the base station through multicast connection (S805).

If the base station forwards all the data in a state that multicast connection is maintained, the base station forwards the sleep response message (MOB_SLP-RSP) to the mobile station to allow the mobile station to perform conversion to class 3 of the power saving mode, thereby saving the power until the next multicast data are transmitted (S807). The mobile station which has received the sleep response message maintains the power saving mode for the sleep interval at the conversion time to the power saving mode (S809). Afterwards, if the base station transmits data, the power saving mode is disabled again (S811), and the steps S803 to S811 are repeated.

Figure 9:
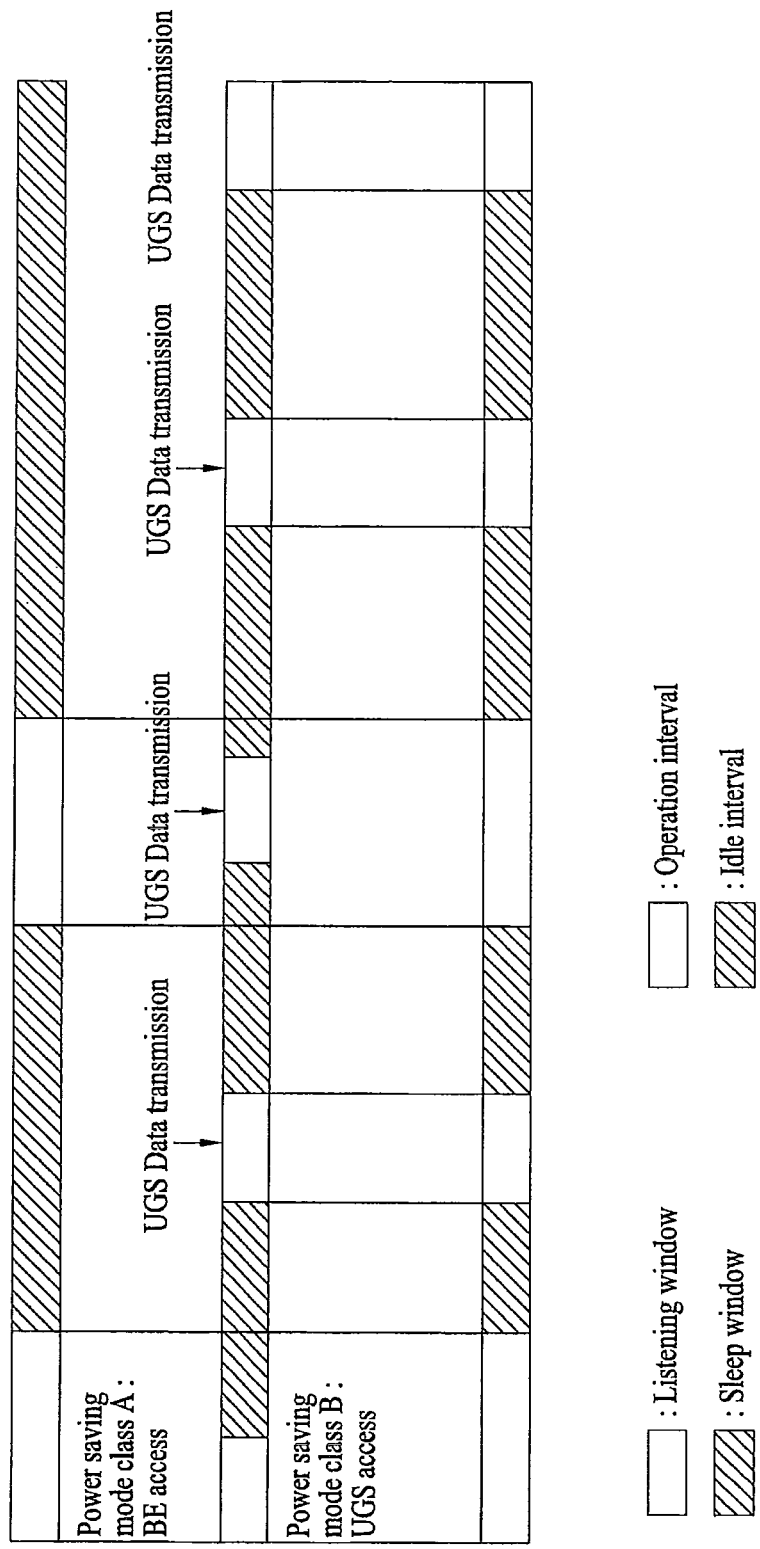
FIG. 9 is a conceptional view illustrating operation characteristics when a plurality of power saving mode classes are enabled in a mobile station.

Meanwhile, FIG. 9 is a conceptual view illustrating operation characteristics when a plurality of power saving mode classes are enabled in the mobile station. The broadband wireless access system supports a power saving class per connection according to the service type to reduce power consumption of the mobile station. As shown, it is noted that the mobile station in which several power saving classes are enabled temporarily disables uplink and downlink communication with the base station to avoid power consumption for an overlap interval of sleep intervals for each class.

Figure 10:
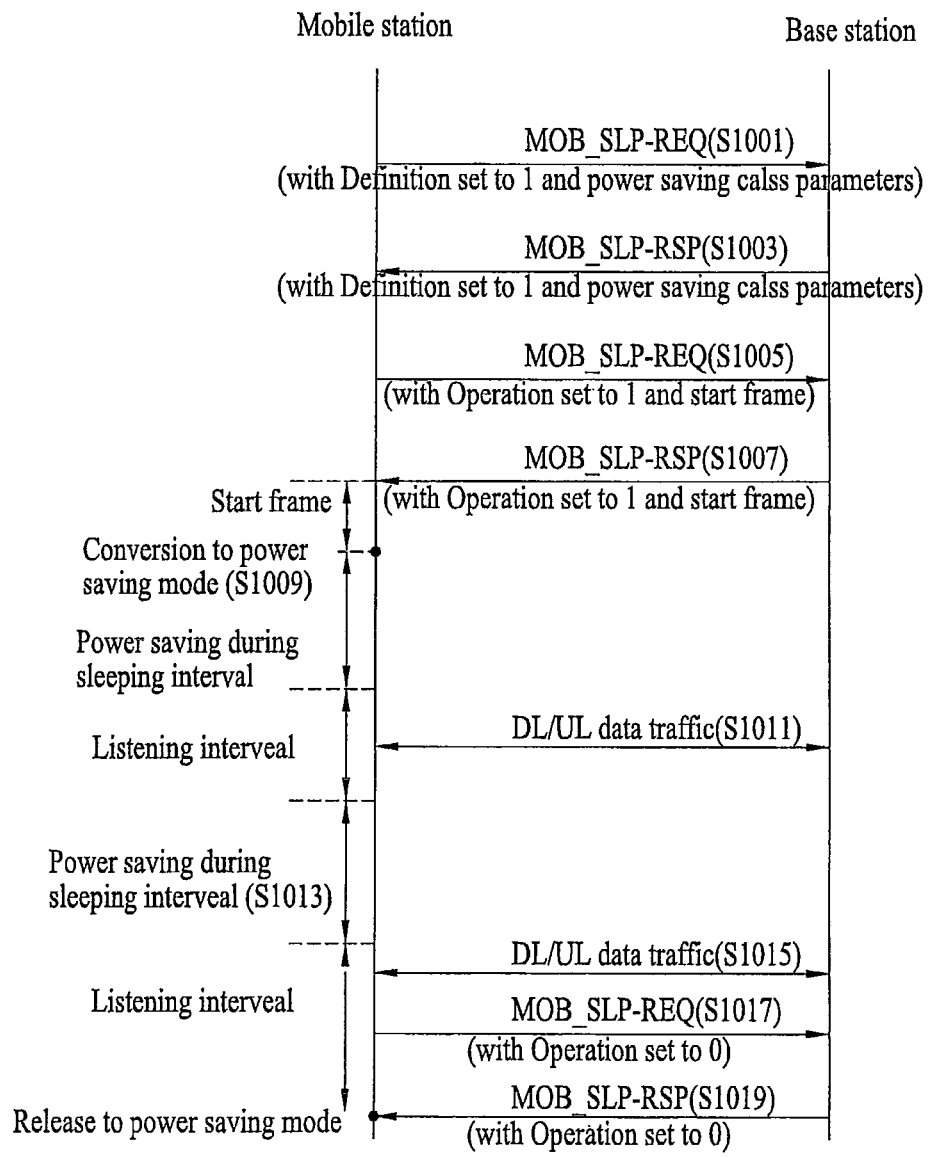
FIG. 10 is a flow chart between a mobile station and a base station to illustrate operation characteristics of the mobile station in a power saving mode.

FIG. 10 illustrates a signal flow between the mobile station and the base station to illustrate operation characteristics of the mobile station in the power saving mode converted by the classes 1 to 3.

Generally, the power saving mode is operated by two steps, a definition step of the power saving class and an operation step of the power saving class. The definition step of the power saving class is to define power saving parameters such as sleep window, listening window, and connection ID. The definition step of the power saving class includes allocating specific power saving class ID depending on the defined power saving class and allocating different power saving class IDs if different power saving parameters exist for one power saving class. Also, the operation step of the power saving class enables the operation of the defined power saving class or disables the operation of the enabled power saving class.

To define the power saving class, the mobile station in the normal operation mode forwards the sleep request message (MOB_SLP-REQ) to the service base station (S1001), wherein the sleep request message includes power saving parameters such as power saving class type, connection direction, initial sleep window, listening window, final sleep window, final sleep window exponent, traffic indicator flag, and connection ID. At this time, a definition field is set to 1 to indicate the sleep request message for defining the power saving class.

The base station which has received the sleep request message forwards the sleep response message (MOB_SLP-RSP) to the mobile station (S1003), wherein the sleep response message includes power saving parameters such as power saving class type, connection direction, initial sleep window, listening window, final sleep window, final sleep window exponent, traffic indicator flag, sleep ID, and connection ID.

To request conversion to the power saving mode, the mobile station should forward the sleep request message (MOB_SLP-REQ) to the base station (S1005), wherein the sleep request message includes the operation field set to 1. At this time, the mobile station transmits the sleep request message along with a start time of the power saving mode.

The base station which has received the sleep request message of which operation field is set to 1 forwards the sleep response message (MOB_SLP-RSP) to the mobile station (S1007), wherein the sleep response message includes the operation field set to 1 and the conversion start time to the power saving mode.

The mobile station which has received the sleep response message is converted into the power saving mode at the start time (S1009). The mobile station does not receive a downlink signal forwarded from the service base station for the sleep interval, which is the unavailable communication interval, to minimize power consumption, and does not transmit uplink traffic to the service base station.

On the other hand, the mobile station can receive downlink data from the service base station and transmit uplink data to the service base station for the listening interval which is the available communication interval (S1011). If the listening interval expires, the mobile station maintains the power saving mode by the sleep interval to avoid power consumption (S1013). The mobile station performs transmission and reception of unlink/downlink data with the service base station for the listening interval (S1015).

If the mobile station should disable the power saving class during the listening interval, the mobile station transmits the sleep request message (MOB_SLP-REQ) or a sleep control header to the base station (S1017), wherein the sleep request message includes the operation field set to 0, the operation field indicating a disabled status of the power saving mode. The service base station which has received disabling request of the power saving mode through the sleep request message or the sleep control header forwards the sleep response message (MOB_SLP-RSP) to the mobile station (S1019), wherein the sleep response message includes the operation field set to 0, the operation field indicating the disabled status of the power saving mode. The mobile station which has received the sleep response message of which operation field is set to 0 disables the corresponding power saving class to end the power saving mode. However, if a plurality of power saving classes are enabled, the operation of the corresponding power saving class can only be disabled.

Figure 11:
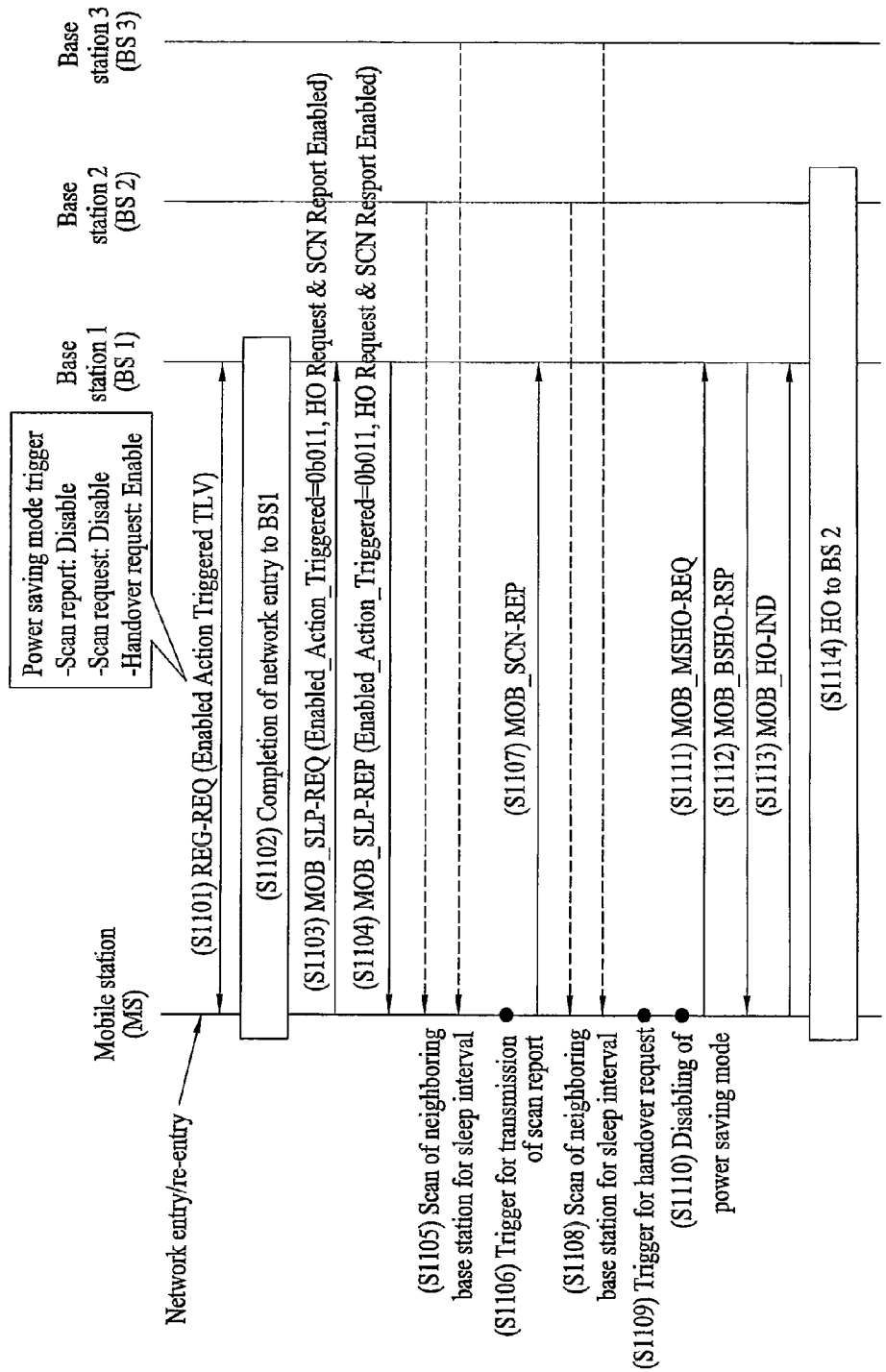
FIG. 11 is a flow chart between a mobile station and a base station to illustrate an example of determining whether a mobile station enables or disables a handover triggering operation of a power saving mode during network registration procedure and applying the handover triggering operation by modifying the same during definition and enabling procedure of the power saving mode.

FIG. 11 is a flow chart between a mobile station and a base station to illustrate an example of determining whether a mobile station enables or disables a handover triggering operation of a power saving mode during network registration procedure and applying the handover triggering operation by modifying the same during definition and enabling procedure of the power saving mode.

In this embodiment, a scan report operation of the power saving mode disabled during the network registration (or network entry) procedure of the mobile station is enabled during definition and enabling procedure of the power saving mode.

If the mobile station is first powered on or executes handover to register in a network, the mobile station receives the handover triggering information of Table 1 and Table 2 from the service base station through the channel information message (DCD) or the neighboring base station information message (MOB_NBR-ADV). Subsequently, the mobile station can previously determine how to perform a handover related triggering operation during the operation to the power saving mode by transmitting and receiving the parameters of Table 5 to and from the base station through the registration request (REG-REQ)/response (REG-RSP) message (S1101). Specifically, the mobile station can set the handover related triggering operation as scan report: disable, scan request: disable, and handover request: enable in the power saving mode through the parameters of Table 5.

If the network registration procedure ends, the mobile station maintains the normal operation status in which data transmission and reception between the mobile station and the base station can be performed (S1102).

Afterwards, the mobile station transmits the sleep request message (MOB_SLP-REQ) for defining and enabling the power saving mode to the service base station (BS 1) (S1103), receives the sleep response message (MOB_SLP-RSP) in response to the sleep request message, and is converted into the power saving mode (S1104). In this case, if the mobile station desires to enable the scan report operation during the power saving mode, the mobile station sets Bit #0 of Enabled_Action_Triggered item (Table 5) included in the sleep request message (MOB_SLP-REQ) to 1. If the response message (MOB_SLP-RSP) to the corrected sleep request message (MOB_SLP-REQ) is received, the mobile station corrects Enabled Action item of the handover triggering information to the Enabled_Action_Triggered item.

Afterwards, the mobile station can perform scanning of the neighboring base station even for the sleep interval (S1105), and compares metric values, such as signal to interference and noise ratio (SINR), received signal strength indication (RSSI) and round trip delay (RTD), which are collected through scanning, with the control information of Table 4 to determine whether to perform scan report.

If the predetermined metric values collected by scanning satisfy function item of Table 4 to adapt to an occurrence condition of a scan report event, since the scan report item is enabled, scan report trigger is performed (S1106). In this case, the mobile station transmits a scanning report message (MOB_SCN-REP) to the service base station BS1 for a communication availability interval (or listening interval) and then maintains the power saving mode (S1107).

Afterwards, the mobile station can perform scanning of the neighboring base station for the sleep interval (S1108), and compares metric values, such as signal to interference and noise ratio (SINR), received signal strength indication (RSSI) and round trip delay (RTD), which are collected through scanning, with the control information of Table 4 to identify whether to perform handover request.

As a result of scanning, if it is determined that handover is to be performed, since Bit #1 (handover request item) is enabled, handover request trigger is normally performed (S1109).

As the handover request trigger is performed, the mobile station disables the power saving mode to perform the handover procedure (S1110), and transmits the handover request message (MOB_MSHO-REQ) to the service base station (BS1) (S1111). If the handover response message is arrived from the service base station (BS1) (S1112), the mobile station again transmits the handover indication message (MOB_HO-IND) to the corresponding base station to release connection with the service base station (S1113). Subsequently, the mobile station performs the network re-registration procedure (or network re-entry) with the handover target base station (BS 2) (S1114).

If the scan report is to be transmitted during the sleep mode of the power saving mode in the above steps, the mobile station can transmit the scan report message to the base station on standby until the listening interval to maintain the enabled power saving class. Alternatively, the mobile station may selectively disable the power saving class and transmit the scan report message.

Furthermore, a transmission operation of the scan request message during the handover trigger operation is enabled in the power saving mode, two types of cases may be considered like the case of the scan report. That is, the case where a corresponding trigger condition occurs during the sleep interval and the case where the corresponding trigger condition occurs during the listening interval may be considered. If the transmission condition of the scan request message is satisfied during the sleep interval, the mobile station disables the power saving class and transmits the scan request message to the base station. As a result, the mobile station can be allocated with a time for scanning of the neighboring base station. Alternatively, the mobile station can transmit the scanning request message to the base station during the listening interval while maintaining the power saving class. The base station which has received the scanning request message from the mobile station can allocate a scanning interval. In this case, the allocated scanning interval is associated with the sleep interval and the listening interval of the power saving class which is previously enabled, and then is applied for calculation of the communication availability interval between the service base station and the mobile station.

Figure 12:
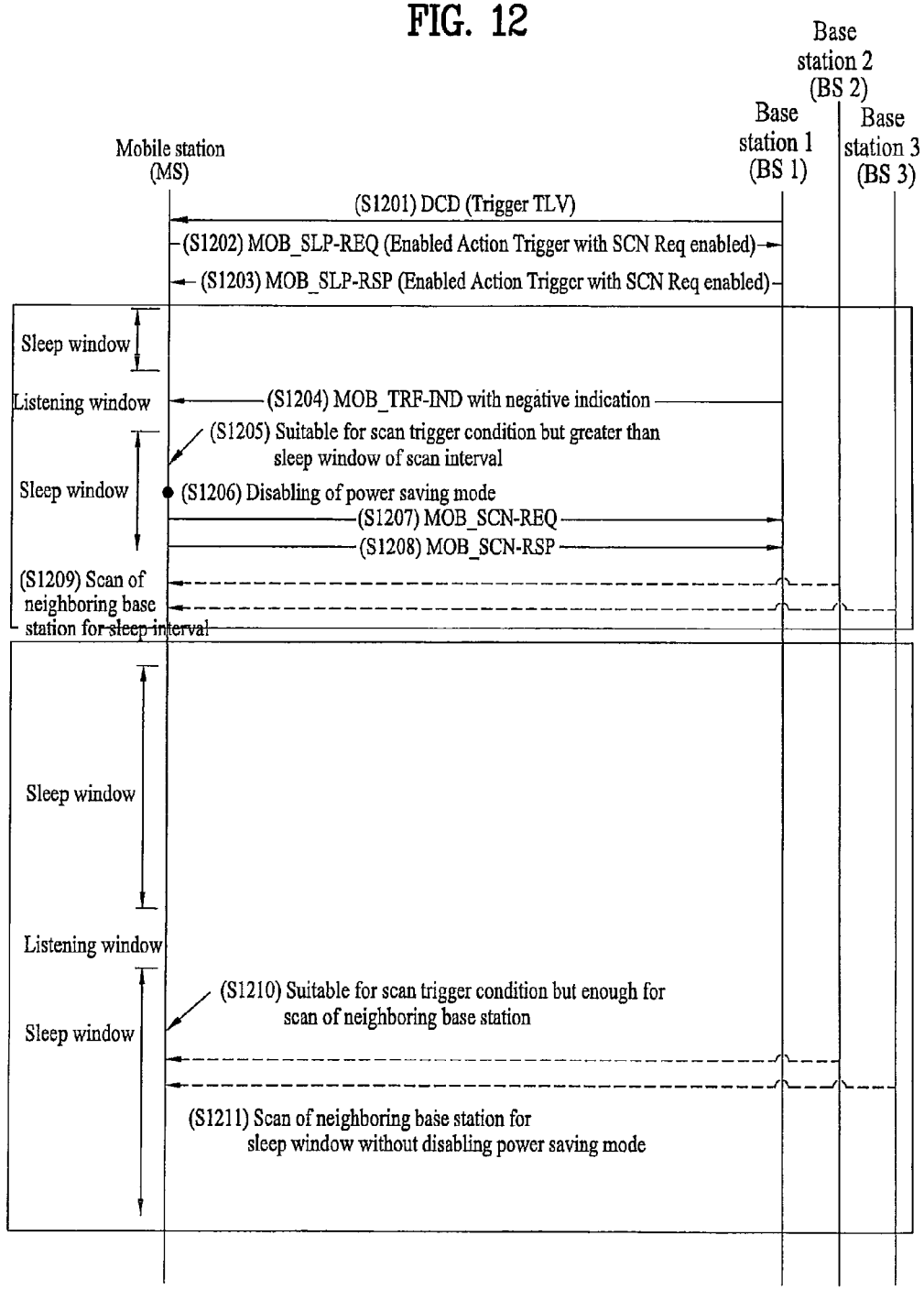
FIG. 12 is a flow chart between a mobile station and base stations to illustrate an example of performing scanning of a neighboring base station for handover during a sleep mode by using handover triggering information included in a downlink channel descriptor (DCD) or neighboring base station information (MOB_NBR-ADV) message in a power saving mode.

FIG. 12 is a flow chart between a mobile station and base stations to illustrate an example of performing scanning of a neighboring base station for handover during a sleep mode by using handover triggering information included in a downlink channel descriptor (DCD) or neighboring base station information (MOB_NBR-ADV) message in a power saving mode.

The following Table 9 illustrates an example of a parameter included in the sleep request/response message (MOB_SLP-REQ/RSP) to determine whether the handover triggering operation is enabled or disabled in the power saving mode, and the following Table 10 illustrates an example of a parameter included in a downlink channel descriptor (DCD) to provide handover triggering information.

TABLE 9

| Type | Length | Value | Scope |
|---|---|---|---|
| 3 | 1 byte | If trigger condition is satisfied during sleep mode, If Bit #0 is set to 1, MOB_SCN-REPORT message response for trigger If Bit #1 is set to 1, MOB_MSHO-REQ message response for trigger If Bit #2 is set to 1, mobile station initiates scanning of neighboring base station for trigger by transmitting MOB_SCN-REQ message If Bit #3 is set to 3, mobile station performs scan of neighboring base station during trigger Bit #4~Bit #7: Reserved, Shaall be set to 0. | MOB_SLP-REQ/RSP |

TABLE 10

| Name | Length | Value |
|---|---|---|
| Type | 2 bits (MSB) | Trigger metric type: 0x00: CINR metric 0x01: RSSI metric 0x02: RTD metric 0x03: Reserved |
| Function | 3 bits | Computation defining trigger condition: 0x00: Reserved 0x01: metric of neighboring base station is greater than absolute value 0x02: metric of neighboring base station is smaller than absolute value |

TABLE 10-continued

| Name | Length | Value |
|---|---|---|
| | | 0x03: metric of neighboring base station is relatively greater than metric of service base station
0x04: metric of neighboring base station is relatively smaller than metric of service base station
0x05: metric of service base station is greater than absolute value
0x06: metric of service base station is smaller than absolute value
0x07: Reserved
Note: 0x01-0x04 are not applicable to RTD trigger metric |
| Action | 3 bits (LSB) | Action performed upon reaching trigger condition:
0x00: Reserved
0x01: MOB_SCN-REP message response after each scanning time period for trigger
Note: if base station metric is defined, 0x03 and 0x04 are not available (for example, function of 0x5-6 is available) |

In this embodiment, it is supposed that the mobile station is operated in the power saving mode.

The mobile station receives handover triggering information, which includes items of Table 10, from the service base station through the channel information message (DCD) or neighboring information message (MOB_NBR-ADV) (S1201).

Afterwards, the mobile station transmits the sleep request message (MOB_SLP-REQ) for defining and enabling the power saving mode to the service base station (S1202), receives the sleep response message (MOB_SLP-RSP) in response to the sleep request message and then is converted into the power saving mode (S1203). At this time, if the mobile station desires to enable the scan request operation during the power saving mode, the mobile station sets Bit #1 of Enabled_Action_Triggered item (Table 9) included in the sleep request message (MOB_SLP-REQ) to 1 and forwards the set value to the base station. If the mobile station receives the sleep response message (MOB_SLP-RSP), in which Bit #1 of Enabled_Action_Triggered item is set to 1, from the base station, the scanning trigger operation is enabled in the power saving mode.

The mobile station does not perform transmission and reception of uplink/downlink data to reduce power consumption during the sleep interval, and can identify the presence of downlink traffic to be forwarded to the mobile station by receiving a traffic notification message transmitted from the base station during the listening interval (S1204). If the trigger condition is satisfied during the operation to the power saving mode, the mobile station can be operated as follows by comparing whether the sleep interval is greater than a scanning interval for scanning.

In other words, if the trigger condition for performing scanning is satisfied but the sleep interval is shorter than the scanning interval (S1205), the mobile station disables the power saving mode to perform scanning (S1206). In this case, the mobile station requests the base station to allocate the scanning interval for scanning of the neighboring base station by transmitting the scanning request message to the base station (S1207). The base station which has received the scanning request message from the mobile station regards that the mobile station has disabled the power saving mode, and allows scanning request by allocating the scanning interval to the mobile station (S1208). The mobile station performs scanning of the neighboring base station during the scanning interval allocated from the base station (S1209).

If the trigger condition for performing scanning is satisfied and the sleep interval is longer than the scanning interval (S1210), the mobile station performs scanning of the neighboring base station by using the sleep interval (S1211).

Meanwhile, if the scanning trigger operation of the power saving mode is enabled in the mobile station and the scanning condition is satisfied, the mobile station may always disable the power saving mode to transmit the scanning request message to the base station.

Finally, a configuration of a mobile station which supports the aforementioned method of executing handover will be described below.

Figure 13:
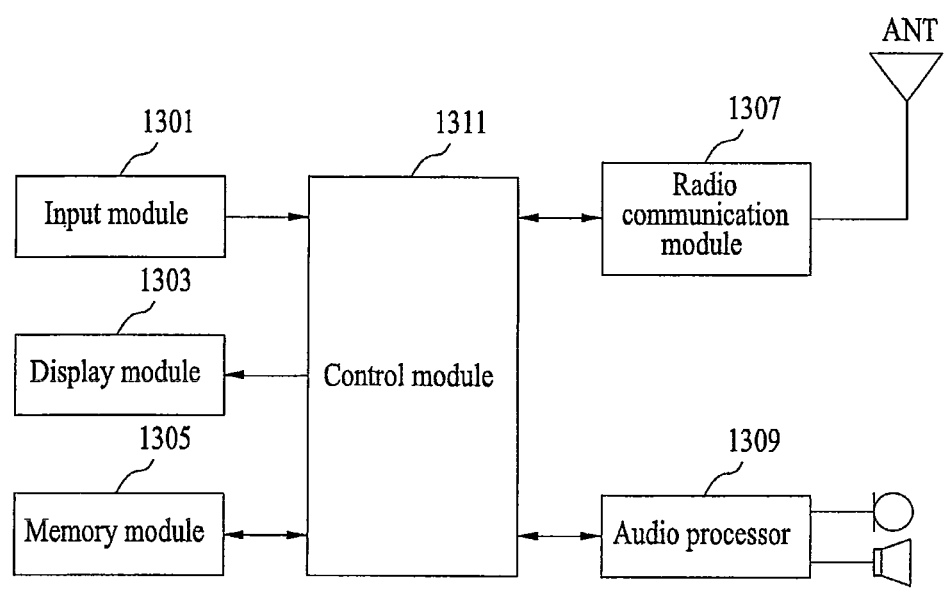
FIG. 13 is a block diagram illustrating a main configuration of a mobile station which supports a handover method according to the present invention.

FIG. 13 is a block diagram illustrating a main configuration of a mobile station which supports a handover method according to the present invention.

The user mobile station includes an input module 1301 selecting a desired function or inputting information, a display module 1303 displaying various kinds of information for operating the user mobile station, a memory module 1305 storing various programs required to operate the user mobile station and data to be transmitted to a receiving side, a radio communication module 1307 receiving an external signal and transmitting data to the receiving side, an audio processor 1309 converting a digital audio signal into an analog audio signal, amplifying the converted audio signal, and outputting the amplified signal to a speaker (SP), or amplifying an audio signal from a mike (MIC) and converting the amplified signal into a digital signal, and a control module 1311 controlling entire driving of the user mobile station.

The radio communication module 1307 further includes a function of receiving handover triggering information and a signal for measurement of channel quality. The control module 1311 further includes a function of performing scan of neighboring base stations in the sleep mode, and triggering specific handover related operation designated in the triggering information if the scan result adapts to trigger condition set in the triggering information.

Particularly, the control module 1311 may further include a function of including Enabled_Action_Triggered item of Table 5 in the sleep request message (MOB_SLP-REQ) transmitted to the base station to enter the power saving mode or the ranging request message (RNG-REQ) for handover, and may further include a function of correcting Enabled_Action item of Table 4 to Enabled_Action_Triggered item included in the sleep response message (MOB_SLP-RSP) or the ranging response message (RNG-RSP).

Meanwhile, examples of the user mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

According to the present invention, since different handover related operations can be performed for each class, efficient handover can be executed. Also, since a plurality of handover related operations can be designated, it is possible to reduce the number of receiving times of the triggering information and control whether each of the handover related operations is performed during the power saving mode. In this case, it is possible to properly control handover of the base station while performing the power saving mode of the mobile station.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method of executing a handover of a mobile station in a mobile communication system, the method comprising: receiving a registration message including control information associated with the handover during a network entry procedure, wherein the control information includes operation class information and enabled action information, wherein the operation class information designates at least one class among a plurality of classes of power-saving modes in which at least one handover-related operation is to be triggered, and wherein the enabled action information indicates whether the at least one handover-related operation is enabled for each of the designated classes by the operation class information among the plurality of classes of power-saving modes; changing an enabled status of at least one handover-related operation in the designated class by the operation class information among the plurality of power-saving modes when the mobile station enters the power-saving mode in which the mobile station operates; and performing at least one enabled handover-related operation in accordance with the control information based on a class of power-saving mode in which the mobile station operates.

2. The method of claim 1, wherein the at least one handover-related operation includes at least one of a scan request, a scan report, and a handover request.

3. The method of claim 1, wherein the changing of the enabled status occurs during a conversion to a requested power-saving mode.

4. The method of claim 2, wherein the control information includes information related to a condition for performing a scan request, a condition for performing a scan report, and a condition for performing a handover request.

5. The method of claim 4, further comprising performing a scan report operation if the scan report operation is enabled and the condition for performing the scan report is satisfied.

6. The method of claim 5, wherein the scan report operation is performed by transmitting a scanning report message to a base station during a communication availability interval.

7. The method of claim 4, further comprising performing a handover request operation if the handover request operation is enabled and the condition for performing the handover request is satisfied.

8. The method of claim 7, further comprising:
disabling the power-saving mode in which the mobile station operates, when a handover procedure is initiated in response to a handover request operation; and
executing the handover procedure in accordance with a previously determined power-saving mode.

9. The method of claim 4, further comprising performing a scan request operation if the scan request operation is enabled and the condition for performing the scan request is satisfied.

10. The method of claim 9, wherein if a sleep interval is determined to be shorter than a scanning interval, the method further comprises:
disabling the power-saving mode in which the mobile station operates;
acquiring an allocated scanning interval for scanning at least one neighboring base station; and
performing scanning of the at least one neighboring base station during the allocated scanning interval.

11. The method of claim 9, wherein if a sleep interval is determined to be longer than a scanning interval, the method further comprises maintaining the power-saving mode in which the mobile station operates.